United States Patent

[11] 3,628,631

[72] Inventor Paul C. O'Leary
2668 Stanford Lane, Salt Lake City, Utah 84117
[21] Appl. No. 837,133
[22] Filed June 27, 1969
[45] Patented Dec. 21, 1971

[54] LUBRICATOR DEVICE
11 Claims, 8 Drawing Figs.

[52] U.S. Cl. .................................... 184/55 A, 261/78 A
[51] Int. Cl. .................................... F16n 7/34
[50] Field of Search .................................... 184/55, 55 A, 56, 56 A; 261/78

[56] References Cited
UNITED STATES PATENTS

| | | | |
|---|---|---|---|
| 2,105,491 | 1/1938 | Huffman | 184/55 |
| 2,897,919 | 8/1959 | Dellner | 184/55 |
| 2,945,560 | 7/1960 | Malec | 184/55 |
| 3,040,835 | 6/1962 | Ahnert | 184/55 |

FOREIGN PATENTS

| | | | |
|---|---|---|---|
| 831,676 | 3/1960 | Great Britain | 184/55 |

Primary Examiner—Manuel A. Antonakas
Attorney—M. Ralph Shaffer

ABSTRACT: An on-stream lubricator device for interposition between an air-driven tool and an air supply of practically any given pressure above one atmosphere. The lubricator device is constructed to receive and contain lubricating fluid, such as oil, which is maintained under pressure only during operation of the air-driven equipment. Input air pressure is effective, when selectively applied in accordance with the selective operation of the air tool used, to open an air valve in the device so as to supply a rapid stream of air for driving the air tool used and, in addition and simultaneously, to open a lubricating valve and apply positive pressure to lubricant in the device, whereby to pressure-eject lubricant into such air stream for atomization therein, this so that the air stream so entraining droplets of lubricant may be used both to power a tool such as a rock drill and also lubricate the operating moving parts thereof. When the tool's lubricant supply is nearing depletion, valving means positively shut off both air and lubricant.

3,628,631

INVENTOR.
PAUL C. O'LEARY
BY
*M. Ralph Shaffer*
HIS ATTORNEY

INVENTOR.
PAUL C. O'LEARY
BY
HIS ATTORNEY

LUBRICATOR DEVICE

The present invention relates to lubricating devices, and more particularly, to a lubricator for interposition in an air pressure line between an air tool to be driven and its air pressure source. The lubricator of the invention is positively operating in the sense that the air pressure coupled to the tool is used not only to supply intermittently, as selected, an air stream for entraining atomized lubricant introduced therein, but also operates valve means to supply similarly intermittent positive pressure of the lubricant feeding into the air stream. A number of important ancillary advantages as to the construction and operation of the device are hereinafter pointed out.

In the past it has been common practice to interpose, between an air pressure source and an air tool to be driven by the air pressure source, a lubricator device wherein a suitable lubricant such as oil is introduced into and atomized within the air stream fed to the tool. Heretofore the practice has been to employ in such a lubricator device a venturi of predetermined design. The venturi, of course, is used to create a pressure differential to be relied upon in drawing lubricant from said source into the moving air stream leading to the tool.

There are a number of disadvantages to the conventional, venturi-including devices for lubricating air-driven equipment. In the first place, for a given lubricator there must be a specific size of venturi which has to be designed for a specific air pressure. For example, if one provides a large venturi and introduces the same into a system having a very low-volume movement of air through it, thereby may not be a sufficient pressure differential developed; hence, oiling becomes deficient. At the same time, if a lubricator has a small venturi in its construction and is designed for low air-volume operation, and the user employs the device in a high-volume system, excessive oil results. Consequently, commercially available lubricators at the present time are designed for a given and quite limited, specific flow range; beyond their limited ranges such devices are not workable.

Another problem is to be considered. In devices as are presently, commercially available and employ the venturi principle, when there is no flow of air through the device, no oil theoretically should flow; however, conventional porting directly connecting air and oil cavities does enable the oil to leak into the air stream cavity, thus causing flooding of the tool.

The present invention avoids use of a venturi as a lubricant-introducing device relative to the air stream and, instead, utilizes the air pressure in the system, when applied to the lubricator and tool, to open suitable valving means for supplying the requisite air stream and lubricant introduction therein and, in addition, utilizes the air pressure for producing via a positive moving piston, pressure against a lubricant such as to force the lubricant to flow into the air stream.

Suitable safety features are included as well as an indicator marking indicating when the supply of lubricant in the device is at or near exhaustion. At this point both the air and oil supplies are automatically shut off in a manner hereinafter described. At this time, the user can simply remove the fill plug of the device, introduce a new charge of lubricant therein, and then again selectively apply pressure thereto for selectively operating the desired air tool.

Accordingly, a principal object of the present invention is to provide a new and improved lubricator device for air-driven systems and tools, which will accommodate a wide range of operating air pressures.

A further object is to provide a lubricator wherein positive pressure is supplied the lubricant by a piston or equivalent means, which piston can in turn be operated by air pressure only when the latter is intermittently used to power an attached, air-driven tool.

An additional object is to provide a new and improved lubricator wherein production of both the air stream and lubricant flow therein is achieved through air pressure positively applied.

A further object is to provide a lubricator having a movable extension indicating times of depletion of lubricant supply.

An additional object is to provide a lubricator which is very rugged in its design and extremely safe to use.

A further object is to provide an air pressure movable piston in a lubricator device, which piston is operative to apply positive and preferably increased pressure to the lubricant, for urging the same in an atomized fashion in an air stream in proximity therewith.

A further object is to provide a lubricator tool wherein air pressure applied thereto is operative for valving both air flow as well as lubricant flow and, in addition, is operative to apply positive and preferably increased pressure to the lubricant being forced into the air stream of the device.

A further object is to provide for automatic air and lubricant shutoff when the lubricant supply is depleted.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 2:
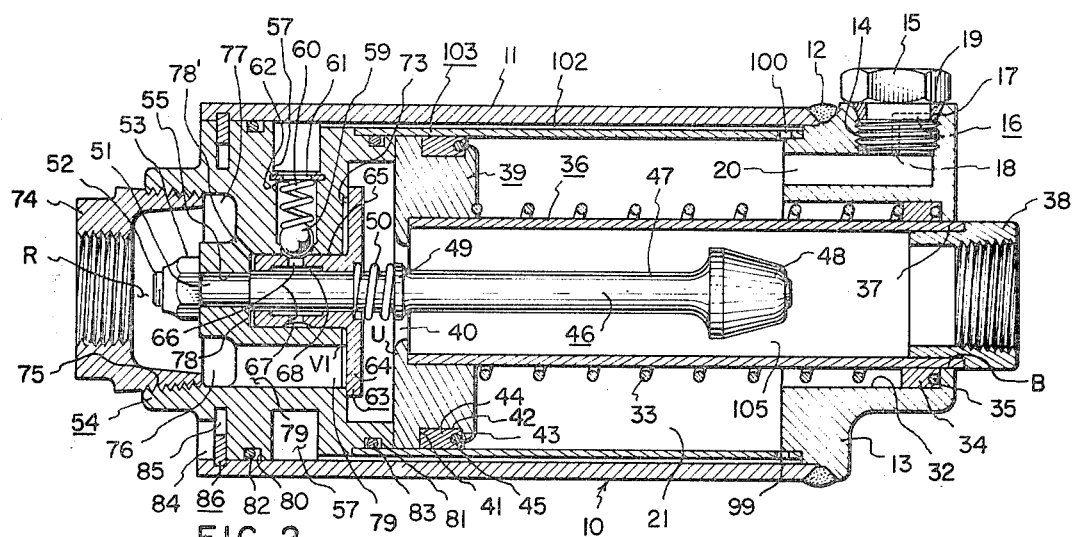
FIG. 2 is a longitudinal section of the device of FIG. 1 and is taken along the line 2—2 in FIG. 1.
Figure 3:
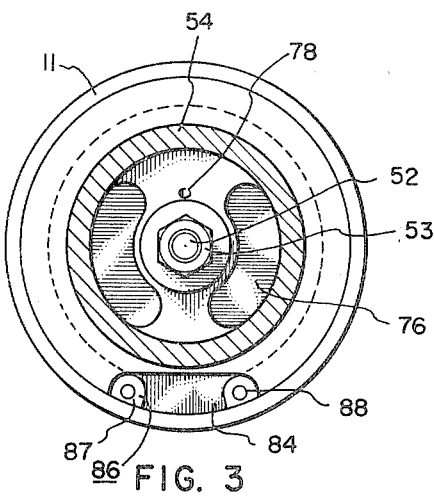
FIG. 3 is an end elevation, partially in section, and is taken along the line 3—3 in FIG. 1.
Figure 4:
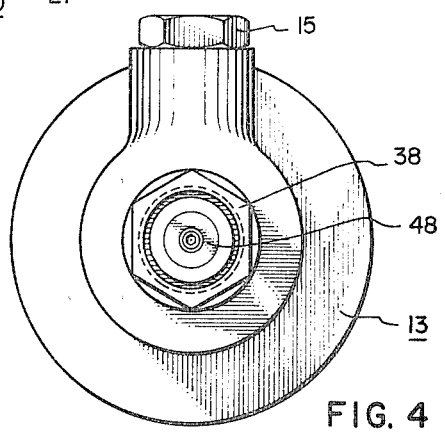
FIG. 4 is an end view of the equipment of FIG. 1 and is taken along the line 4—4 in FIG. 1.
Figure 5:
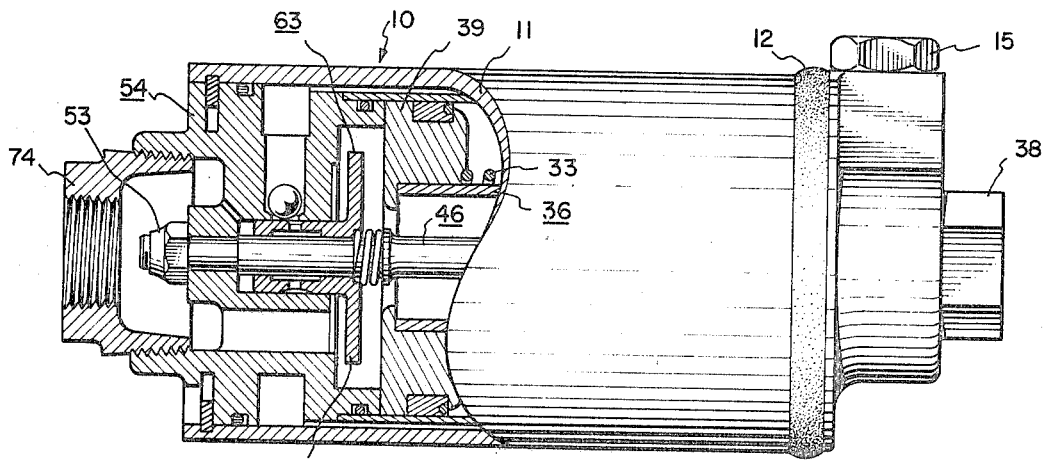
FIG. 5 is a cutaway, partially sectioned view of the structure of FIG. 1, is identical to that shown in FIG. 2, but indicates a second operating position of the equipment wherein pressure has been applied and the air valve lubricator opened to provide (1) an air stream and also (2) consequential, positively driven lubricant introduced into that stream.
Figure 6:
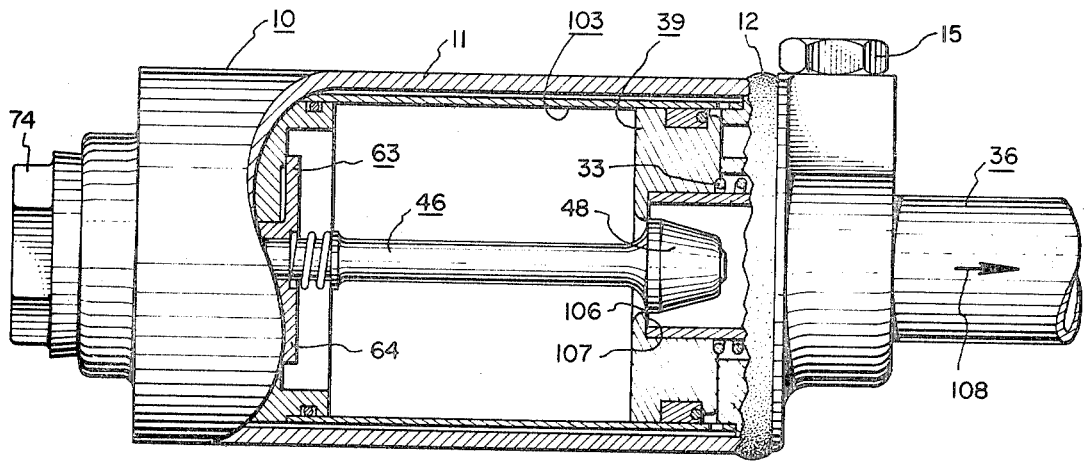

FIG. 6 is an elevation similar to FIGS. 2 and 5, is broken away and sectioned at a portion thereof, and illustrates the device as having been operated, either continuously and intermittently, so as to exhaust or substantially exhaust a lubricant supply of the device; in such event the air supply piston tube is shown extended so as to reveal a lubricant depletion indication, additionally, the piston of the device is illustrated as having been returned to its most forward point so as to effectively shut off both air and lubricant supplies.

Figure 1:
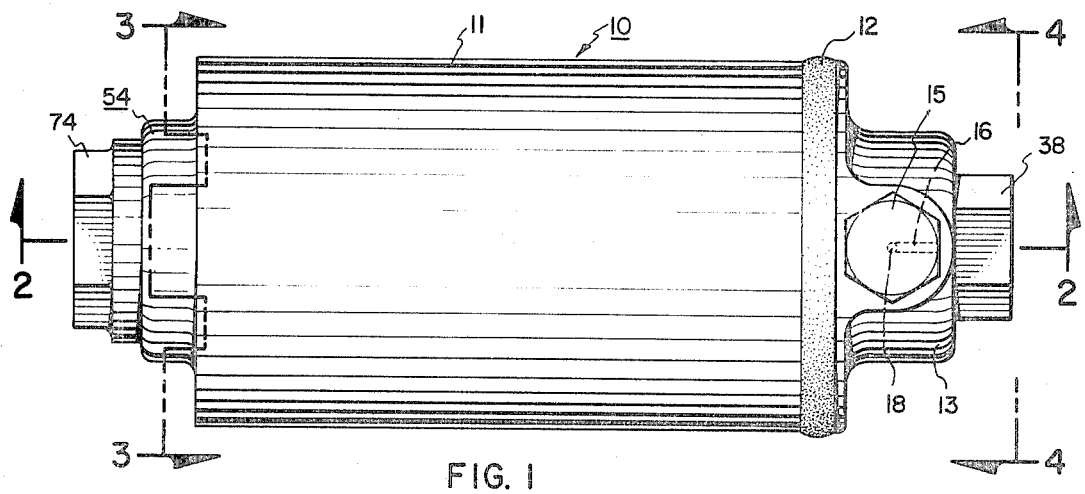
FIG. 1 is a side elevation of the lubricator tool of the present invention in a preferred form thereof.
Figure 7:
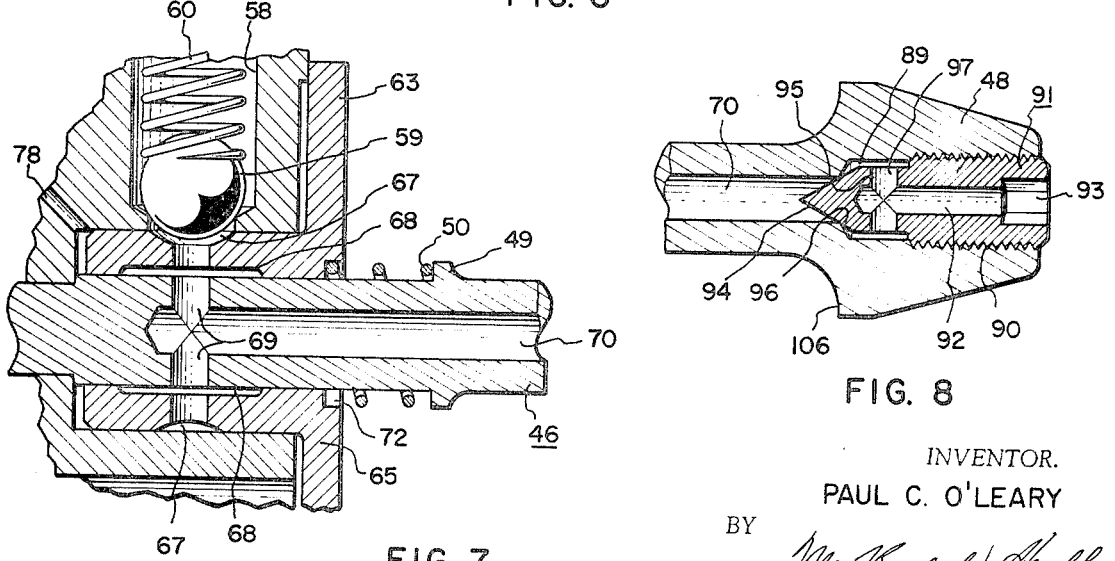

FIG. 7 is an enlarged, fragmentary, sectioned detail proportion of the structure shown in FIG. 1.

Figure 8:
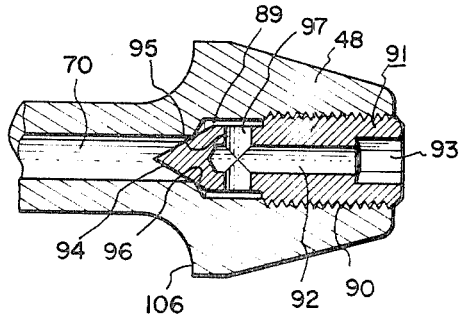

FIG. 8 is an enlarged, fragmentary, sectioned detail of the nozzle head portion of the nozzle of the lubricator device of FIG. 1.

In FIGS. 1–4, 7 and 8 the air tool lubricator 10 of the present invention is shown to include an outer cylindrical cover 11 which is secured by a peripheral weld 12 to base 13. Base 13 includes a threaded port 14 for receiving threaded, lubricant fill plug 15. The latter includes a safety vent 16 which may take the form of a pair of intersecting apertures 17 and 18. Aperture 17 as shown is disposed beneath the seal seat 19 for plug 15. Inlet passageway 20 of base 13 communicates with lubricant or oil chamber 21. Base 13 includes a central bore 32 which receives piston return spring 33. The latter seats against annular seal 34 disposed against interior shoulder 35. Accordingly, spring 33 functions not only as a return spring for piston 39, hereinafter described, but also serves to apply pressure to the seal 34 so that a tight seal may be obtained as between base 13 and tube 36. Secured as by brazing to the downstream end 37 of tube 36 is an exhaust fitting 38. Securement of an air tool to the latter is preferably accomplished by a threaded connection, as shown. Tube 36 is journaled in base bore B.

Tube 36 may be brazed or otherwise secured to piston 39. The latter includes central aperture 40 and also an exterior, depending shoulder 41 forming recess 42 in conjunction with the opposite shoulder 43. Disposed between shoulders 41 and 43 is a seal 44 having the usual O-ring insert 45.

Disposed through central aperture 40 is a nozzle member 46, the latter including a nozzle stem 47 terminating in a nozzled head 48.

Nozzle stem 47 includes a shoulder abutment 49 which provides a seat for valve spring 50. The latter circumscribes the upper portion of the nozzle stem. Stem 47 proceeds upstream to terminate in the turned-down portion 51 which is threaded at 52 and secured by nut 53 to head member 54. The latter, of course, will be provided with a central aperture 55 accommodating such passage and mounting.

Head member 54 includes a peripheral, lubricant-receiving passageway 57, and drilled therein is a ball valve bore 58. Included therein is a valve ball 59 optionally backed by ball spring 60. The latter, if used, is retained in place by retainer 61 fitting into retainer recess 62. Valve member 63 is provided with a valving flange 64 and a valve body 65 integral therewith. Valve body 65 includes respective ports 66 which may be connected together externally by a peripheral ball seat 67. Interior annular recess 68 provides a lubricant flow passageway completely about the nozzle stem to facilitate conduction of lubricant therethrough into cross passageway 69 of nozzle member 46. The stem of the latter includes a central nozzle passageway 70 communicating with cross passageway 69 in the manner indicated in FIG. 7.

For proper operation of valve member 63 a seat recess 73 may be provided. Annular recess 73 forms in part an annular air chamber over the flange 64 such that air under pressure may be provided completely around the top (or left side) of flange 64 when the air flow is turned on and proceeds through air intake fitting 74.

As to fitting 74, the same is threadedly connected to internal threads 75 of head member 54. Kidney-shaped slots 76 and 77 are provided, with vent hold 78' being included to vent the air space between the upper portion of valve body 57 and annular shoulder 78. Air passageway 79 interconnects kidney recess 76 with the annular recess 73 so that the air communication may proceed from air intake fitting 74 to the upper or operating (left) surface of flange 64 of the flange member 63. Appropriate recesses 80 and 81 are provided in head member 54 and respectively receive O-ring seals 82 and 83. If desired, an elongate slot 84 may be provided in head member 54 and communicate with annular retainer groove 85. The latter receives retainer 86 which, upon closure of the ends 87 and 88 thereof will permit the device to be disassembled. This is accomplished by the user urging the assembly comprising the nozzle member 46, head member 54, and air intake fitting 74 to the left while urging the cylindrical cover 11, base 13 and their associated equipment to the right. It is noted that because of the design illustrated the entire tool may be disassembled in a very straightforward and rapid manner.

As to the nozzle head 48, nozzle passageway 70 in FIG. 8 is shown to communicate with a coaxially aligned enlarged bore 89. The latter is threaded at 90 and receives threaded nozzle insert 91. Insert 91 comprises a needle-type valve having central aperture 92, a wrench socket 93 contiguous therewith, and a cross bore 95 contiguous with central bore 92. Insert 91 is pointed at 94 to serve as a needle valve relative to chamfered valve seat 96. Accordingly, when insert 91 is turned outwardly and the valve, hence, is open, namely central passageway 70 is then able to conduce into passageway 89. The air lubricant mixture hence is permitted to proceed through crossbore 95 and into central bore 92, out of the needle-valve insert. It is apparent in FIG. 8 that the flow volume may be adjusted by the suitable threaded adjustment of insert 91. A suitable wrench or screwdriver connection such as a slot may be provided in lieu of socket 93 so that insert 91 may be adjusted appropriately for volume flow.

Coacting with piston 39 and completing the construction is a piston cylinder 103 which, if desired, can be pressed over or otherwise secured to base 13. Ports 99 and 100 provide intercommunication between chamber 21 and a thin annular chamber 102. The latter communicates as shown with annular passageway 57 of head member 54.

The structure as thus far described operates as follows.

In the absence of air pressure at air intake fitting 74, then fill plug 15 may be removed so that oil chamber 21 may be filled or refilled completely with oil or other lubricant. Note is to be made that as the plug 15 is gradually threaded outwardly, safety vent 16 first engages the outside atmosphere so as to vent off any pressure contained within chamber 21.

Since no air pressure exists at air intake fitting 74, piston return spring 33 will have heretofore urged the piston 39 upstream, this until the upper surface of piston 39 engages the lower surface of head member 54. Fill plug 15 is replaced and the lubricator at this time is charged with oil or other lubricating fluid.

Let us assume at this time that air pressure is applied to the air intake fitting 74, and this preferably by a control valve intended to actuate the air tool to be hose-connected to exhaust fitting 38. Such air pressure will build up against the upstream surface of valve flange 64, this by direct communication through passageway 79 to the central region R of air intake fitting 74, so that the valve member 63, of which flange 64 is an integral part, will progressively move to the right of the viewer. This action serves to unseat valve ball 59. It is to be noted that the air pressure not only opens the valve including valve member 63, but also provides air pressure against the upper surface U of piston 39. Such air pressure also, and additionally, urges piston 39 to the left to compress piston return spring 33. This action has a direct effect in positively applying pressure to the lubricant within chamber 21. Such pressured lubricant then proceeds through small ports 99 and 100 to fill the space 102 circumscribing the interior cylinder 103. The lubricant, hence, proceeds under pressure through annular passageway or space 102 and hence flows into annular recess or passageway 57, there to proceed through the valve including valve ball 59 to enter nozzle passageway 70, and proceed then through threaded nozzle plug 91 in FIG. 3. Hence, oil or other lubricant is forced out of nozzle head 48 under predetermined pressure. Again, this pressure is supplied by the pressure of the air connected to air intake fitting 74.

It is noted that this pressured air, in addition to pressuring the lubricant supplied to the nozzle member 46, also is effective to open the valve V1, including valve member 63, so as to provide a rapidly flowing volume of air to the interior of tube 36, i.e. the nozzle mixing chamber 105. Accordingly, the pressured lubricant is here atomized and carried by the air stream out of fitting 38 toward the air tool to which the lubricator of the present invention is connected.

It is here to be noted that the lubricator of the invention is readily adapted to intermittent, operative use, this by supplying air intermittently to the lubricator, as is selected for intermittent running of the air tool connected to the lubricator. Each time the air pressure is turned off the valve V1, of course, will be closed, and valve member 63 returned to its seat. Subsequent applications of intermittent air will again open the valve V1 to apply a rapid stream of air in chamber 105 as well as again reapply pressure to the lubricant within oil chamber 21. Note is to be made that the oil or other lubricant stored in the tool is relieved of pressure the instant that the air supply is turned off.

Subsequent use of the tool, of course, will extend outwardly, and continue to extend outwardly, the piston rod or tube 37, this until piston 39 at least engages annular shoulder 106 of nozzle 48. Such is accomplished through the provision of the piston 39 of an annular, cooperative, internal shoulder 107.

As a consequent of this action a buildup of air pressure will exist in the cylinder area to the left of piston 39. This continues until a substantial pressure equilibrium is reached, thereby permitting return spring 50 to reseat valve member 63 by the contact of flange 64 against its valve seat. Such action further enables ball valve 59 to reseat, thus shutting off communication of the lubricant into the interior of nozzle member 46. Hence, no lubricant dripping relative to the nozzle will occur.

As a practical matter, when the user notices that his power tool is not operating even while the control valve thereof, located upstream of the lubricator, is open, then he will merely turn off the valve. Immediately prior or at this time piston 39 will be returned to its original position under the pressure of piston return spring 33.

Before this point has been reached, however, the user will be able to determine how much additional lubricant supply he has remaining by simply observing an indicator, such as an arrow at 108 in FIG. 6, on the exterior surface of tube 36. Such a progressively lengthening indicia can be made immediately observable to the user to indicate that the lubricant supply is nearly exhausted. At this point the user will leave off the air pressure applied to fitting 74 so as to permit piston 39 to return to its initial position under the pressure of return spring 33. At this point the tool may be again filled with lubricant; since the ball valve is seated, the entire tool can be filled without chancing leakage into the nozzle area proper.

At this point pressure is reapplied to the tube, air pressure may be made again immediately available to the lubricator so that, upon desired operation of the air tool in question, a control valve (not shown) thereof, located upstream of the lubricator, may be actuated so as to reintroduce selectively air pressure into area R, depress valve V1, and apply pressure to the lubricant by virtue of the piston 39 maintained under said air pressure, so that the high velocity air stream containing entrained atomized oil is immediately supplied at and through fitting 38.

Note is to be made that by virtue of the volume displacement of tube 36, the area of the piston applied directly to the lubricant is greatly decreased relative to the area against which the pressured air is applied. The force summation, hence, over the upper surface of the piston effect an increased pressure against lubricant within chamber 21 so that the lubricant pressure is made substantially greater than the actual pressure of the air employed to run the lubricator and operate the air tool attached thereto. From a practical standpoint the tool will be designed such that there is a sufficient pressure increase of the lubricant relative to the air desired without measurably detracting from the volume of lubricant storage of the lubricator.

What is achieved, therefore, is a tool wherein there is incorporated a positive piston and cylinder type lubricant feed. No airflow or lubricant flow is possible when the air check valve is closed. Not is to be noted that the tubular piston rod preferably includes a volume indicator to indicate to the user the volume of oil or other lubricant contained within the lubricator at any particular point in operation of the equipment.

The nature of the concentric cylinder construction provides for extreme use of the tool without chancing malfunction. The needle valve oil adjustment of the nozzle is tamperproof as the air hose leading to the tool must first be removed in order to enable adjustment thereof. As a practical matter, once this valve is adjusted it needs to be very seldom changed.

Other advantages include long-wearing construction, oil porting which is nonclogging, all moving parts are in the lubricating oil path, for adequate lubrication, the cylindrically shaped tool will not catch on external objects, and so forth.

While particular embodiments of the present invention have been shown and described, it will be obvious to those skilled in the art that changes and modifications may be made without departing from this invention in its broader aspects.

I claim:

1. A lubricating device for air pressure power systems, said device including, in combination, structure defining a lubricant chamber, an air inlet, and an air lubricant outlet; stationary, elongate mixing means operatively interposed between said chamber, inlet and outlet, for combining lubricant from said chamber with pressured air present at said inlet, to produce a lubricant entraining air stream discharging outwardly through said outlet; and movable piston means, having a central aperture receiving said elongate mixing means, and responsive to air pressure present at said inlet for applying pressure against said lubricant contained in said chamber, to force the latter toward said elongate mixing means, said piston means coacting with said elongate mixing means for closing said outlet with said elongate mixing means to thereby prevent the flow of air through said outlet when said lubricant within said chamber becomes essentially exhausted as to supply.

2. Apparatus according to claim 1 wherein said chamber comprises a cylinder, said piston being operatively disposed in said cylinder.

3. Apparatus according to claim 1 wherein said elongate mixing means comprises a tube and a nozzle selectively engaging said piston means and centrally disposed axially in said tube, first valving means interposed between said tube and said inlet and responsive to applied air pressure thereat for opening into said tube, whereby to permit said air pressure to create said air stream passing through said tube, and second valving means for providing valved communication between said chamber and said nozzle, whereby to allow lubricant within said chamber to pressure eject, under said air pressure, into and through said nozzle.

4. Apparatus according to claim 1 wherein said elongate mixing means comprises a tube and a nozzle disposed within said tube, said structure including mutually spaced, inner and outer cylinders circumscribing said tube and forming a doubled-back cavity, said pressure applying means comprising piston means interposed between said inlet and outlet and operatively interposed between said tube and said inner cylinder, wherein said tube comprises piston rod means affixed to said piston, said structure including a base, said tube being journaled to said base, and wherein said tube includes an indicator marking means for indicating degree of lubricant depletion.

5. Apparatus according to claim 3 wherein said first valving means, when opening, operatively engages said second valving means to likewise open the latter.

6. A lubricating device for air pressure power systems, said device including, in combination, structure defining a lubricant chamber, an air inlet, and an air lubricant outlet; mixing means operatively interposed between said chamber, inlet and outlet, for combining lubricant from said chamber with pressured air present at said inlet, to produce a lubricant-entraining air stream discharging outwardly through said outlet; and means responsive to air pressure present at the said inlet for applying pressure against said lubricant contained in said chamber, to force the latter toward said mixing means, wherein said mixing means comprises a tube and a nozzle disposed in said tube, first valving means interposed between said tube and said inlet and responsive to applied air pressure thereat for opening, whereby to permit said air pressure to create said air stream passing through said tube, and second valving means for providing valved communication between said chamber and said nozzle, whereby to allow lubricant within said chamber to pressure eject, under said air pressure, into and through said nozzle, wherein said first valving means, when opening, operatively engages said second valving means to likewise open the latter, and wherein said first valving means comprises a head having a through aperture and a valve member having a body journaled for longitudinal reciprocation within said through aperture and a valve flange integral with said valve body, said head including a transverse bore providing a valve orifice, said valve body having valve seat, second valving means operably disposed in said transverse bore and operably engaging said seat, said tube having aperture means interposed between said valve seat and the tube's interior.

7. A lubricating device including, in combination, a head and a base coaxially disposed and mutually spaced apart, an outer cylinder interconnecting said head and base, these two forming the opposite ends of said cylinder, said head being provided with an air inlet, said base being provided with an air lubricant outlet, an elongate nozzle secured to said head and extending longitudinally within said cylinder toward said base, a tube axially disposed over said nozzle and journaled in said base to operatively extend therethrough, an inner cylinder spaced from said outer cylinder and extending between said head and said base, a spring-loaded piston operatively disposed in said inner cylinder and centrally connected to said tube, said head including air passageway means therethrough, first valving means interposed between the space between said inner and outer cylinders and said nozzle and responsive to the presence of air pressure at said inlet for selectively supplying lubricant communication between said space and said nozzle, and second valving means mounted to said nozzle and responsive to air pressure at said inlet and air passageway means for communicating said air pressure to said piston, whereby to thrust the same downstream and urge lubricant downstream through said cylinder and upstream through said space toward said first valving means.

8. Apparatus according to claim 7 wherein said nozzle includes an upstream-facing shoulder, said piston including a downstream-facing abutment engaging said shoulder at a downstream extension of travel of said tube.

9. Structure according to claim 8 wherein said second valving means includes a return spring, said shoulder and abutment comprising an airflow impediment, whereby to permit said second valving means to reseat under the pressure of said return spring.

10. A lubricating device for air pressure power systems, said device including, in combination, structure defining a lubricant chamber, an air inlet, and an air lubricant outlet; stationary, elongate mixing means operatively interposed between said chamber, inlet and outlet, for combining lubricant from said chamber with pressured air present at said inlet, to produce a lubricant-entraining air stream discharging outwardly through said outlet; movable piston means having a central aperture for receiving said elongate mixing means to thereby permit said piston means to move over said elongate mixing means; air pressure openable valving means operatively interposed between said inlet and said piston means, said piston means being responsive to air pressure present at said inlet, as communicated through said valving means, for applying pressure against said lubricant contained in said chamber, to force the latter toward said elongate mixing means.

11. A lubricating device for air pressure power systems, said device including, in combination, structure defining a lubricant chamber, an air inlet, and an air lubricant outlet; stationary, elongate mixing means operatively interposed between said chamber, inlet, and outlet, for combining lubricant from said chamber with pressured air present at said inlet, to produce a lubricant-entraining air stream discharging outwardly through said outlet; movable piston means having a central aperture for receiving said elongate mixing means to thereby permit said piston means to move over said elongate mixing means; air pressure openable first valve means operatively interposed between said inlet and said piston means; second valving means interposed between said chamber and said elongate mixing means and cooperably engaging said first valving means, to be opened thereby upon the opening of the latter, said piston means being responsive to air pressure present at said inlet as communicated through said valving means for applying pressure against said lubricant contained in said chamber, to force the latter through said second valving means toward said mixing means.

* * * * *